UNITED STATES PATENT OFFICE.

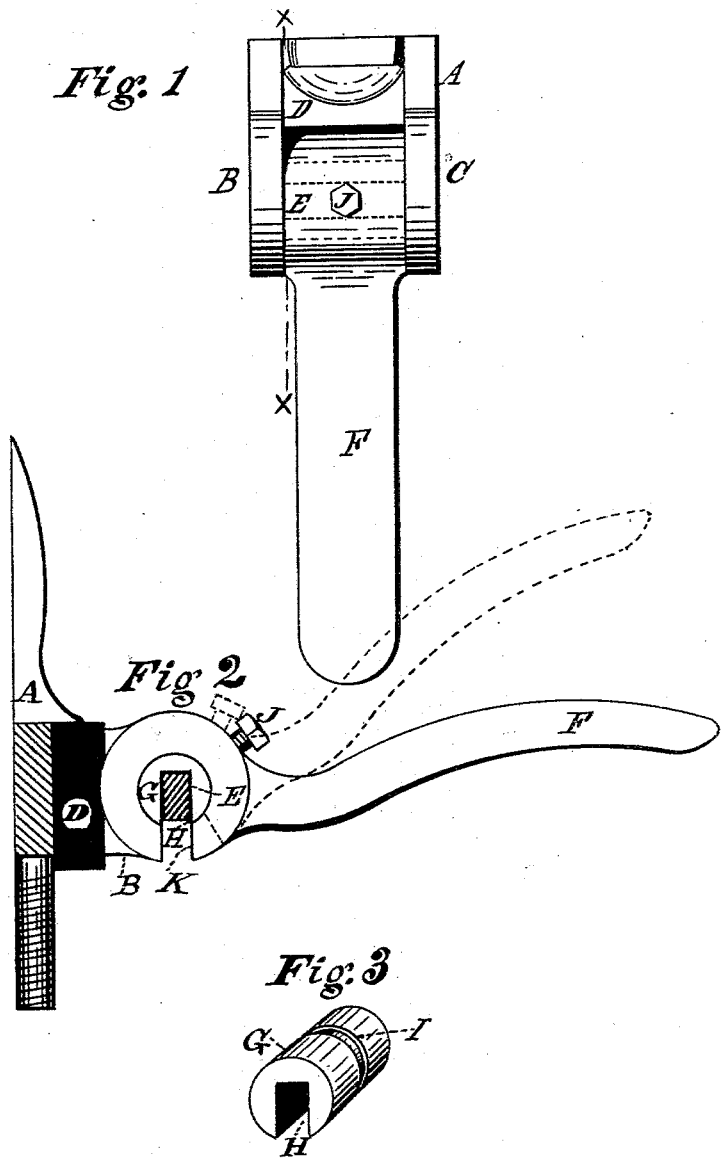
A. W. COTTRELL.
Thill-Coupling.
No. 210,921.  Patented Dec. 17, 1878.

ALBERT W. COTTRELL, OF WHITESVILLE, NEW YORK.

IMPROVEMENT IN THILL-COUPLINGS.

Specification forming part of Letters Patent No. 210,921, dated December 17, 1878; application filed July 12, 1878.

*To all whom it may concern:*

Be it known that I, ALBERT W. COTTRELL, of Whitesville, in the county of Allegany and State of New York, have invented certain new and useful Improvements in Thill-Couplings, which improvements are fully described in the following specification and accompanying drawings, in which—

Figure 1 is a top view of the coupling; Fig. 2, a section through line X X, Fig. 1; and Fig. 3 represents a perspective view of the center-pin upon which it turns.

This invention relates to the coupling-irons for the thills of carriages or wagons; and it consists of a thill-iron provided with a cylindrical pin arranged slightly eccentrical, and to move easily within it, and provided with a deep groove along its length on one side, and kept in place or from coming out of the thill-iron by means of a set-screw or pin, and a groove around or partly around its periphery, in combination with a thill-iron coupling provided with a rigidly-attached square, or nearly square, pin, corresponding in size to the longitudinal groove in the cylindrical pin, and a block of rubber or other elastic material to prevent rattling. The thill-iron is also slotted to correspond with said groove, so that when the two are in line they can be easily connected with the square pin and coupling, so as to be securely held in place when the thills are in position to be attached to a horse, as will be more clearly shown by reference to the drawing.

A represents a portion of a thill-iron coupling, having two ears or projections, B C, between which is fastened a rubber block, D. E represents a square pin or bar, rigidly fastened between the parts B C, or formed in one piece with them. (See the section through it in Fig. 2 and the dotted lines in Fig. 1.) F is the thill-iron. It has a round opening, so as to receive the cylindrical pin G, which is provided with a slot or groove, H, to fit the square pin E, and also with a small groove, I, (see Fig. 3,) by which it is held in place to the thill-iron by means of the set-screw J, and at the same time allowed to turn freely. The thill-iron F is also provided with a slot, K, on one side, so that when the pin G is turned so that both slots H K are in line, as shown in Fig. 2, the thill-iron can be easily put in place on the square pin E, or as readily released while in that position. The pin G now acts as a pivot, upon which it may be easily turned.

It will be readily seen that when the thill-iron is turned into the position shown by the dotted lines in Fig. 2 it will be impossible to disengage it from the coupling.

The pin G is arranged a little out of the center of F, as in Fig. 2.

I do not claim, broadly, the combination, with a square pin, of a slotted thill-iron carrying a loose slotted pin or cylinder; but

I claim—

A coupling for vehicle-shafts consisting of the thill-iron A, its ears B C, stationary square pin and rubber block D, and the cylinder G, having a slot communicating with a circular opening arranged eccentrically in the head, all as set forth.

A. W. COTTRELL.

Witnesses:
  WM. S. COTTRELL,
  SIDNEY CRANDALL.